United States Patent
Garbe (10) Patent No.: US 10,066,655 B2
(45) Date of Patent: Sep. 4, 2018

(54) GROMMETS AND METHODS OF INSTALLING GROMMETS

(71) Applicant: Orbital ATK, Inc., Plymouth, MN (US)

(72) Inventor: Duane J. Garbe, Mendon, UT (US)

(73) Assignee: Orbital ATK, Inc., Plymouth, MN (US)

(*) Notice: Subject to any disclaimer, the term of this patent is extended or adjusted under 35 U.S.C. 154(b) by 0 days.

(21) Appl. No.: 15/354,023

(22) Filed: Nov. 17, 2016

(65) Prior Publication Data

US 2018/0135678 A1    May 17, 2018

(51) Int. Cl.
*F16L 5/00* (2006.01)
*H02G 3/22* (2006.01)
*F16B 13/04* (2006.01)

(52) U.S. Cl.
CPC .............. *F16B 13/045* (2013.01); *F16L 5/00* (2013.01)

(58) Field of Classification Search
CPC ... Y10T 16/05; Y10T 16/063; B60R 16/0222; B60R 16/0207; B60R 16/0215; H02G 3/22; H02G 3/0468; H02G 3/0481; H02G 15/013; F16L 5/00; F16B 5/0258; F16B 43/001; F16B 13/025; F16B 13/04; H01R 13/5205; H01R 13/5208
See application file for complete search history.

(56) References Cited

U.S. PATENT DOCUMENTS

| | | | | |
|---|---|---|---|---|
| 1,697,814 A | * | 1/1929 | Forbes | F16F 1/3732 16/2.1 |
| 2,799,528 A | * | 7/1957 | Wilfert | B62D 25/24 174/153 G |
| 2,961,755 A | | 11/1960 | Prince | |
| 3,090,115 A | | 5/1963 | Carr | |
| 3,424,416 A | | 1/1969 | Dell et al. | |
| 3,424,857 A | | 1/1969 | Grommet | |
| 3,506,999 A | * | 4/1970 | Neher | B66B 7/06 16/2.1 |
| 3,580,988 A | * | 5/1971 | Orlowski | H02G 3/0616 16/2.2 |

(Continued)

FOREIGN PATENT DOCUMENTS

EP       0580130 A1    1/1994
WO    2016043245 A1    3/2016

*Primary Examiner* — Chuck Mah
(74) *Attorney, Agent, or Firm* — TraskBritt (57) ABSTRACT

A grommet for installation in an opening of a panel comprises an elastically deformable material having a longitudinal axis extending from a proximal end to a distal end of a grommet body. The grommet body comprises an aperture extending longitudinally through the grommet body between the proximal end and the distal end. A wall-engaging segment defines a longitudinal segment of the aperture and is located to be enclosed by a wall of the opening when the grommet is installed in the panel. A clamping element occludes the aperture in the wall-engaging segment and comprises at least one longitudinally extending through-hole sized and configured to receive an elongated element. The clamping element is located to apply a compressive force on the elongated element to retain the elongated element in the through-hole of the grommet body responsive to disposition of the wall-engaging segment in the opening of the panel.

24 Claims, 8 Drawing Sheets

(56) References Cited

U.S. PATENT DOCUMENTS

| | | | | |
|---|---|---|---|---|
| 4,033,535 A | * | 7/1977 | Moran | F16L 5/00 |
| | | | | 174/153 G |
| 4,460,805 A | * | 7/1984 | Johnson | H01L 317/306 |
| | | | | 16/2.2 |
| 4,685,173 A | | 8/1987 | Pavur | |
| 5,453,579 A | * | 9/1995 | Cohea | H02G 3/083 |
| | | | | 16/2.1 |
| 5,553,368 A | | 9/1996 | Barry | |
| 5,732,440 A | | 3/1998 | Wright | |
| 5,836,048 A | * | 11/1998 | Rossman | H02G 3/083 |
| | | | | 16/2.2 |
| 6,058,562 A | | 5/2000 | Satou et al. | |
| 6,967,285 B2 | | 11/2005 | Sanroma et al. | |
| 7,625,038 B2 | * | 12/2009 | Moccio | B60H 1/248 |
| | | | | 296/154 |
| 7,915,535 B2 | | 3/2011 | Carter | |
| 2006/0086524 A1 | * | 4/2006 | Suzuki | B60R 16/0222 |
| | | | | 174/650 |
| 2007/0137600 A1 | * | 6/2007 | Saito | H02K 5/225 |
| | | | | 123/179.1 |
| 2008/0066949 A1 | * | 3/2008 | Cloud | G02B 6/4471 |
| | | | | 174/153 G |
| 2011/0198110 A1 | | 8/2011 | Fujita | |

\* cited by examiner

GROMMETS AND METHODS OF INSTALLING GROMMETS

STATEMENT REGARDING FEDERALLY SPONSORED RESEARCH OR DEVELOPMENT

This invention was made with government support under Contract No. NNM07AA75C awarded by the National Aeronautics and Space Administration. The government has certain rights in the invention.

TECHNICAL FIELD

The invention, in various embodiments, relates generally to grommets comprising clamping elements, methods of forming such grommets, and methods of installing such grommets to retain elongated elements, such as wires, cables, and the like therein.

BACKGROUND

During the manufacturing processes of various products, holes or other openings may be formed within components such as panels, plates, bulkheads, or other structures of the like. Often the edges of these openings are sharp and may cut, abrade, or otherwise damage electrical elements, such as wires and cables intended to be passed through these openings. Grommets or plugs are commonly used to shield the edges of these openings. In particular, grommets or plugs may be used to protect these electrical elements from being severed or damaged when they are passed through and positioned in these openings.

Grommets are often installed in these openings by either pushing or pulling the grommet through the opening. As grommets may be designed to closely fit the panel openings, tools have been developed to assist in the installation process. Such installation tools are disclosed in U.S. Pat. No. 3,090,115, issued May 21, 1963 to Carr, U.S. Pat. No. 2,961,755, issued Nov. 29, 1960 to Prince, and U.S. Pat. No. 7,915,535, issued Mar. 29, 2011, to Carter.

To retain the wires, wire harnesses, and the like within the grommets, it is common to apply an adhesive, such as an epoxy or cement as disclosed in U.S. Pat. No. 3,424,857, issued Jan. 28, 1969 to Miller et al., to provide a mechanical fastener, such as a clamp, about a segment of the grommet located exterior to the panel opening as disclosed in U.S. Pat. No. 5,732,440, issued Mar. 31, 1998 to Wright, or the like after the grommet is seated in the panel opening.

BRIEF SUMMARY

Some embodiments of the present disclosure include a grommet for installation in an opening of a panel. The grommet comprises an elastically deformable material having a longitudinal axis extending from a proximal end to a distal end of the grommet body. The grommet body comprises an aperture extending longitudinally through the grommet body between the proximal end and the distal end. A wall-engaging segment defines a longitudinal segment of the aperture and is located to be enclosed by a wall of the opening when the grommet is installed in the panel. The grommet body further comprises a clamping element occluding the aperture in the wall-engaging segment. The clamping element comprises at least one longitudinally extending through-hole sized and configured to receive an elongated element. The clamping element is located to apply a compressive force on the elongated element to retain the elongated element in the through-hole of the grommet body responsive to disposition of the wall-engaging segment in the opening of the panel.

Additional embodiments of the present disclosure include a grommet for installation in an opening of a panel. The grommet comprises an elastically deformable material having a longitudinal axis extending from a proximal end to a distal end of the grommet body. The grommet body comprises a bottom wall, a top wall, and sidewalls extending from the proximal end to the distal end and extending between the bottom wall and the top wall. The bottom wall, top wall, and sidewalls define a wall-engaging segment along a portion of a longitudinal length of the grommet body. The wall-engaging segment is located to be enclosed by a wall of the opening when the grommet is installed in the panel. The grommet body further comprises a clamping element extending within the wall-engaging segment. The clamping element comprises at least one longitudinally extending through-hole. The at least one through-hole is sized and configured to receive an elongated element therein and to apply a compressive force on the elongated element to retain the elongated element in the grommet body responsive to disposition of the clamping element within the opening of the panel during installation of the grommet.

Yet further embodiments of the present disclosure include methods of installing grommets into an opening extending through a panel. The method includes inserting an elongated element through a through-hole in a clamping element of a grommet. The grommet comprises an elastically deformable material and defines an aperture extending longitudinally between a proximal end and a distal end thereof. The clamping element extends longitudinally within a segment of the aperture. The method further includes inserting the proximal end of the grommet and the elongated element extending therethrough in an opening extending between a first side and an opposing, second side of a panel. The proximal end of the grommet is pulled through the opening from the first side to the second side to enclose the clamping element within the opening between the first side and the second side of the panel and apply a compressive force to and through the clamping element on the elongated element to retain the elongated element within the grommet.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular component, device, or system, but are merely idealized representations that are employed to describe embodiments of the present invention.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, spatially relative terms, such as "beneath," "below," "lower," "bottom," "above," "over," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. The grommets of the present disclosure may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the terms "configured" and "configuration" refer to a size, shape, material composition, orientation, and arrangement of one or more of at least one structure and at least one apparatus facilitating operation of one or more of the structure and the apparatus in a predetermined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

The following description provides specific details, such as material types, material thicknesses, and other dimensions, in order to provide a thorough description of embodiments of the disclosure.

As previously discussed, grommets are commonly installed within a panel by pushing or pulling a grommet into an opening therein. However, the grommets are usually limited in size and provide a limited area for an installer to grip the grommet in an effort to push or pull the grommet through the panel opening. Furthermore, grommets may be designed to closely fit the panel opening. Therefore, it may take a large amount of force to push or pull the grommets through the panel opening. Installation may be increasingly difficult when the panel is of a substantial thickness, such as about 1 inch or greater. As previously discussed, an installation tool may be required to install the grommet within the panel opening. However, an area on either side of the panel may be occupied by mechanical and/or electrical components to which the wire, wire harness, cable, etc., intended to be passed through and protected by the grommet may extend. Therefore, the panel openings may not be easily accessible, and the installation tool may be too large or otherwise unusable within the area available around the panel openings.

Grommets of the present disclosure may be formed of an elastically deformable material and may comprise a handle segment that may be used to install the grommet within the panel openings. For example, the handle segment may be gripped by an installer to pull the grommet through the panel opening without use of a separate installation tool. Grommets of the present disclosure may also comprise a clamping element. The clamping element may also be integrally formed with the grommet. As explained in further detail below, the clamping element may provide a clamping force on the wires, wire harnesses, and the like passed through the grommet merely by installation of the grommet within the paneling opening. The clamping element of the grommet may eliminate the post-installation step of providing an adhesive, mechanical fastener, or the like over some portion of the grommet to retain the wires, wire harnesses, and the like within the grommet.

Figure 1:
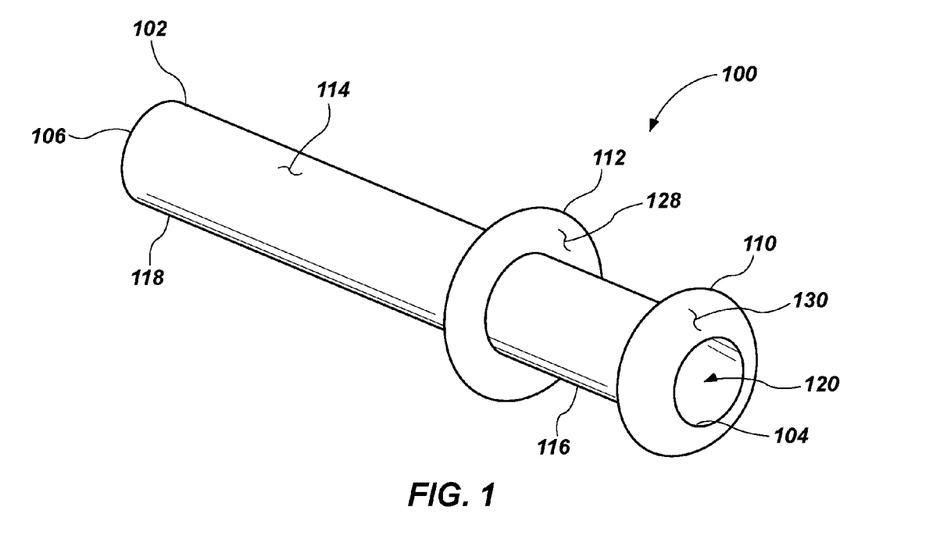
FIGS. 1 through 3 illustrate a perspective view, a distal end view, and a cross-sectional view, respectively, of a grommet according to some embodiments.
Figure 2:
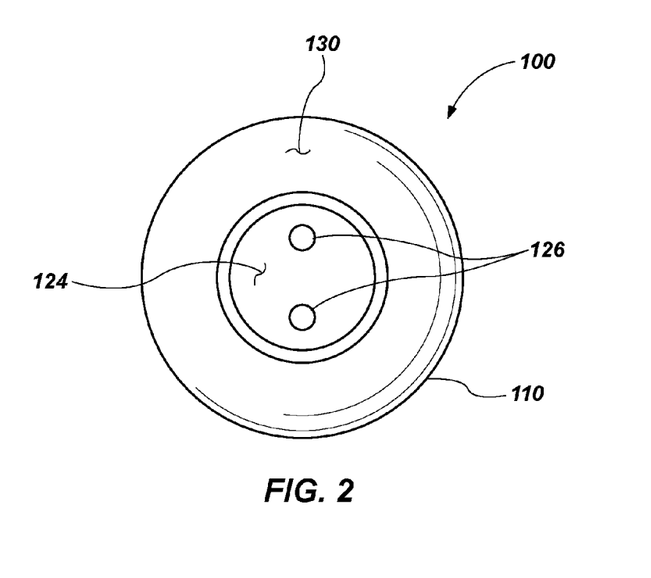
Figure 3:
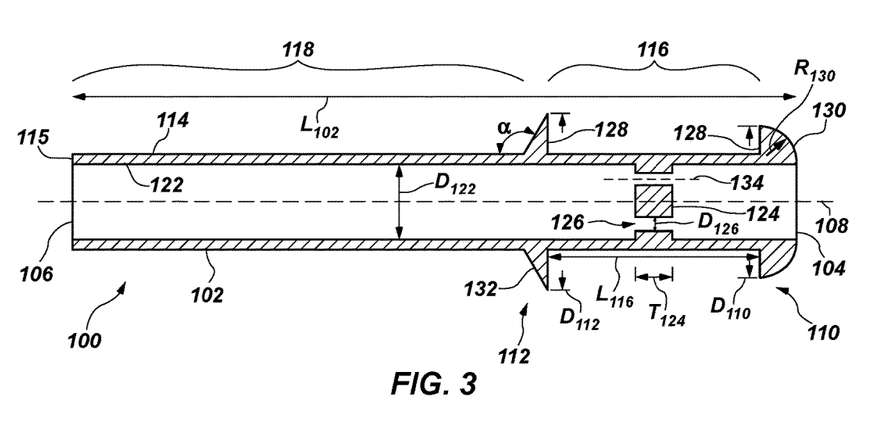

FIGS. 1 through 3 illustrate a grommet 100 according to some embodiments of the present disclosure. The grommet 100 comprises a grommet body 102 having a distal end 104 and a proximal end 106. The grommet body 102 may be arrayed about a central, longitudinal axis 108 extending along a length $L_{102}$ thereof. The grommet body 102 may comprise a first flange 110 and a second flange 112. The first and second flanges 110, 112 may each extend radially outward from an outer surface 114 of walls 115 of the grommet body 102. The segment of the grommet body 102 extending between the first and second flanges 110, 112 may be referred to as a wall-engaging segment 116. When the grommet 100 is installed in a panel, as will be discussed in more detail with regarding to FIGS. 11 through 15, the wall-engaging segment 116 may be housed (e.g., enclosed) within an opening in a panel. A segment of the grommet body 102 extending beyond the second flange 112 to the proximal end 106 may be referred to as the handle segment 118. The handle segment 118 may provide a pulling surface that may be gripped for installation of the grommet 100 within the opening in the panel.

The grommet body 102 may have a shape exhibiting rotational symmetry about the longitudinal axis 108. For example, as best illustrated in FIG. 1, the grommet body 102 may be cylindrical in shape in the handle segment 118 and wall-engaging segment 116. In some embodiments, the grommet body 102 may be configured as a plug. In such embodiments, the grommet body 102 may be solid and configured to fill or close the opening in the panel when installed. In other embodiments, the grommet body 102 may be tubular and hollow. In such embodiments, the grommet body 102 may comprise an aperture 120 extending from the distal end 104 to the proximal end 106.

The aperture 120 may be defined by an inner surface 122 of the grommet walls 115 arrayed about the longitudinal axis 108. In some embodiments, the inner surface 122 may comprise a curved surface extending concentrically about the longitudinal axis 108. The inner surface 122 may have a constant diameter $D_{122}$. By way of example and not limitation, the diameter $D_{122}$ of the inner surface 122 may extend in a range from about 0.5 inch to 2.0 inches and, more particularly, may measure about 1.1 inches. The walls 115 extending between the inner surface 122 and outer surface 114 may have a thickness extending in a range from about 0.1 inch to 0.5 inch and, more particularly, may measure about 0.2 inch. In some embodiments, the grommet body 102 may have a length $L_{102}$ extending in a range from about 5 inches to 20 inches and, more particularly, measuring about 10 inches.

In other embodiments, the aperture 120 of the grommet body 102 may be at least partially disrupted (e.g., occluded) by a clamping element 124. The clamping element 124 may comprise a volume of material that substantially fills at least a segment of the aperture 120. The clamping element 124 may extend longitudinally and radially within a segment of the aperture 120 within the wall-engaging segment 116. The clamping element 124 may comprise at least one through-hole 126 extending longitudinally therethrough. In some embodiments, the clamping element 124 may be integrally formed with the wall-engaging segment 116. In such embodiments, the thickness of the walls 115 increases within the wall-engaging segment 116 and the inner diameter $D_{122}$ decreases to form the clamping element 124.

The first flange 110 may be located at the distal end 104 of the grommet body 102. The second flange 112 may be longitudinally spaced apart from the first flange 110 and may be located intermediately along the length $L_{102}$ of the grommet body 102. Each of the first and second flanges 110, 112 may comprise mutually facing (e.g., opposing) sealing surfaces 128. On a side of each flange 110, 112, opposite the sealing surfaces 128 is an exterior surface 130, 132.

The sealing surfaces 128 may be planar and may extend radially outward and perpendicular to the longitudinal axis 108. When the grommet 100 is installed in a panel, the first and second flanges 110, 112 may lie on opposing surfaces of the panel. More particularly, the sealing surfaces 128 of the first and second flanges 110, 112 may lie on opposing surfaces of the panel. Therefore, the first and second flanges 110, 112 may be spaced apart by a distance that is substantially equal to the thickness of the panel in which the grommet 100 may be installed. In some embodiments, the first and second flanges 110, 112 may be spaced apart by a distance of at least one inch. By way of example and not limitation, the first and second flanges 110, 112 may be spaced apart by a distance extending in a range from about 1.5 inches to 5.5 inches and, more particularly, by a distance of about 2.9 inches.

The sealing surfaces 128 may be sized and configured to form a seal about and adjacent to an opening in the panel in which the grommet 100 is installed, as will be explained in further detail below. Each of the first and second flanges 110, 112 may exhibit a maximum diameter $D_{110}$, $D_{112}$ at the sealing surface 128. In other words, the radially outermost segment of each flange 110, 112 may be coincident with the sealing surface 128. The maximum diameter of the flanges 110, 112 may be greater than an inner diameter of the opening in the panel in which the grommet 100 may be installed. In some embodiments, the flanges 110, 112 may have equal maximum diameters $D_{110}$, $D_{112}$. In other embodiments, the flanges 110, 112 may have unequal maximum diameters $D_{110}$, $D_{112}$. For example, as illustrated in FIG. 3, the second flange 112 may have a greater maximum diameter than the first flange 110. By way of example and not limitation, the first flange 110 may have a maximum diameter $D_{110}$ extending in a range from about 1 inch to 4 inches and, more particularly, may measure about 2.05 inches. The maximum diameter $D_{112}$ may extend in a range from about 1.2 inches to 4.7 inches and may, more particularly, measure about 2.35 inches.

The first and second flanges 110, 112 may be symmetrically shaped about the longitudinal axis 108. For example, the first and second flanges 110, 112 may have rotational symmetry about the longitudinal axis 108. As best illustrated in FIGS. 1 and 3, the first flange 110 may be substantially hemispherical in shape. In such embodiments, the first flange 110 may have a curved, exterior surface 130. For example, the exterior surface 130 may be semi-circular, semi-oval, semi-ellipse, or dome-shaped. As illustrated in the cross-sectional view of FIG. 3, the curved, exterior surface 130 of the first flange 112 may have a radius of curvature $R_{130}$ in a range extending from about 0.25 inch to 1 inch and, more particularly, may be about 0.5 inch.

The second flange 112 may be sized and shaped to ease insertion of the grommet 100 through a panel opening. For example, the second flange 112 may be sized and shaped to lay substantially flat against the outer surface 114 of the grommet body 102 as the grommet 100 is pulled through the panel opening. As best illustrated in FIG. 3, the second flange 112 may be frustoconical in shape. In such embodiments, the exterior surface 132 may be conical. The exterior surface 132 may extend radially outward from the outer surface 114 at an obtuse angle α. By way of example and not limitation, the angle α may extend in a range from about 100° to 150° and, more particularly, may measure about 120°.

With continued reference to FIG. 3, the clamping element 124 may be located to apply a compressive force on an elongated element 404 (FIG. 13) in the through-hole 126 responsive to disposition of the wall-engaging segment 116 in an opening of a panel. In some embodiments, the clamping element 124 may extend at least partially through (e.g., within a segment of) the aperture 120 within the grommet body 102. The clamping element 124 may extend longitudinally between the sealing surfaces 128 of the first and second flanges 110, 112 such that the clamping element 124 extends exclusively within and radially inward of the wall-engaging segment 116. In some embodiments, the clamping element 124 may be coextensive with a length $L_{116}$ of the wall-engaging segment 116 measured between the sealing surfaces 128. In other embodiments, the clamping element 124 may extend along less than the entire length $L_{116}$ of the wall-engaging segment 116 such that a thickness $T_{124}$ of the clamping element 124 is less than the length $L_{116}$. By way of example and not limitation, the thickness $T_{124}$ may extend in a range from about 0.2 inch to 2.0 inches and, more particularly, may measure about 0.5 inch. In some embodiments, the clamping element 124 may be located equidistant from the sealing surfaces 128 of the first and second flanges 110, 112, respectively. In other embodiments, the clamping element 124 may be located proximate to one of the first and second flanges 110, 112 and distal from the other flange. For example, the clamping element 124 may be located proximate to the first flange 110 and distal from the second flange 112. In some embodiments, the clamping element 124 may be located between about 0.5 inch and about 2.5 inches from the sealing surface 128 of the first flange 110 and, more particularly, may be located 1.2 inches from the sealing surface 128 of the first flange 110.

The at least one through-hole 126 may be sized and configured to retain an elongated element 404 (FIG. 13), such as a wire, cable, or other electrical element. For example, the at least one through-hole 126 may have a diameter $D_{126}$ extending in a range from about 0.1 inch to 0.4 inch and, more particularly, may measure about 0.19 inch. In some embodiments, a central axis 134 of the at least one through-hole 126 may be coaxial with the longitudinal axis 108 of the grommet body 102. In other embodiments, the central axis 134 of the at least one through-hole 126 may be parallel but not coaxial with the longitudinal axis 108 of the grommet body 102.

In some embodiments, the clamping element 124 may comprise more than one through-hole 126. In such embodiments, the through-holes 126 may be located equidistant from the longitudinal axis 108. By way of example and not limitation, each through-hole 126 may be separated from the longitudinal axis 108 by a distance extending in a range from about 0.1 inch to 0.6 inch as measured between the central axis 134 and the longitudinal axis 108. More particularly, each through-hole 126 may be located about 0.3 inch from the longitudinal axis 108.

Figure 4:
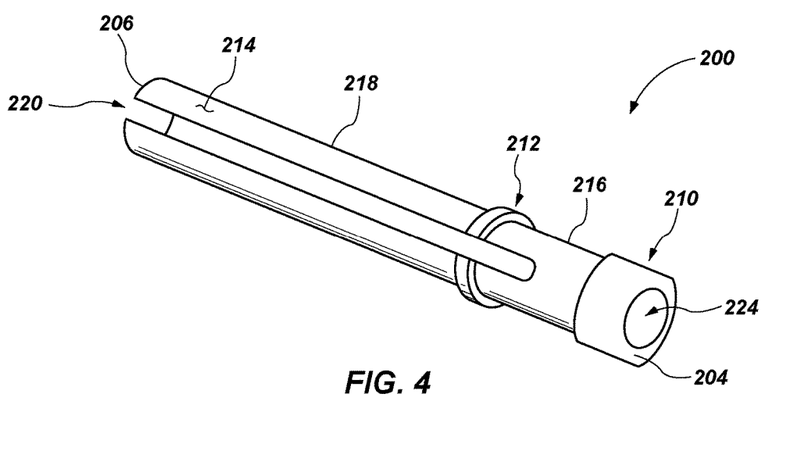
FIGS. 4 through 6 illustrate a perspective view, a proximal end view, and a cross-sectional view, respectively, of a grommet according to other embodiments.
Figure 5:
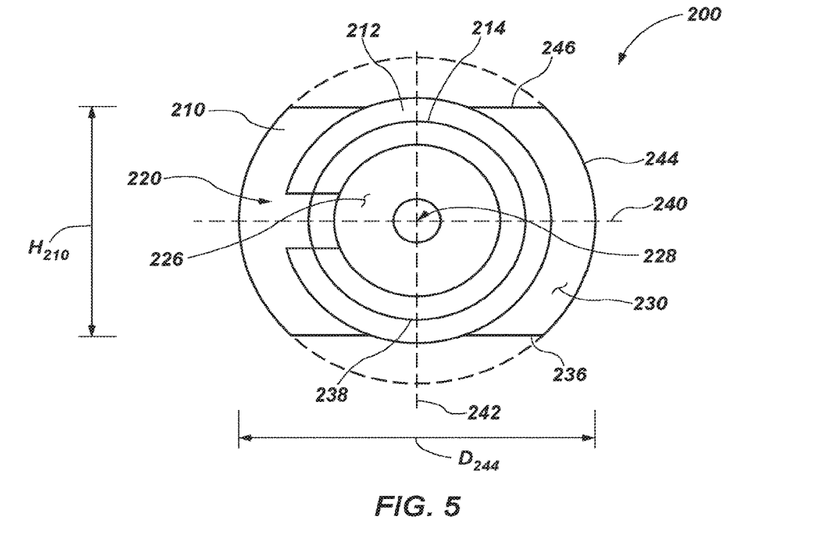
Figure 6:
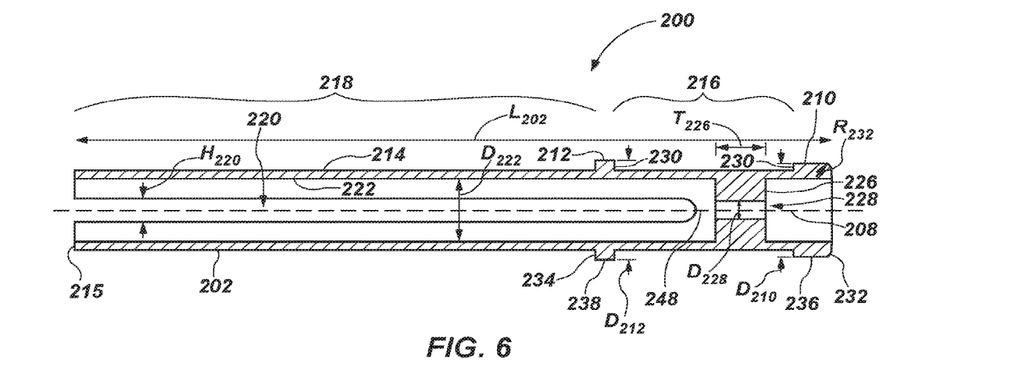
Figure 7:
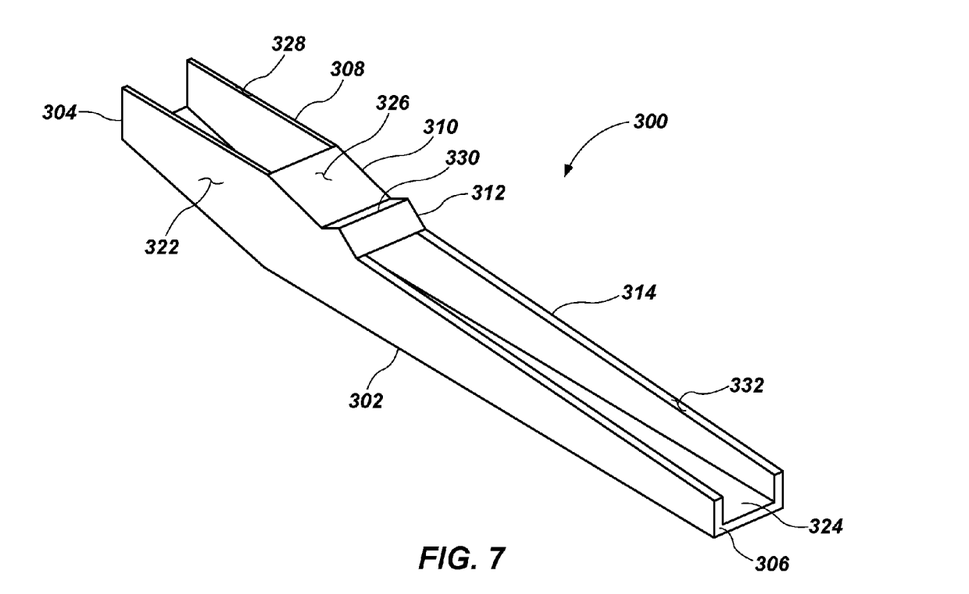
FIGS. 7 through 10 illustrate a perspective view, a proximal end view, a side view, and a cross-sectional view, respectively, of a grommet according to some embodiments.

FIGS. 4 through 6 illustrate a grommet 200 according to other embodiments of the present disclosure. The grommet 200 comprises a grommet body 202 having a distal end 204 and a proximal end 206. The grommet body 202 may be arrayed about a central, longitudinal axis 208 extending along a length $L_{202}$ thereof. The grommet body 202 may comprise a first flange 210 and a second flange 212. The first and second flanges 210, 212 may extend radially outward from an outer surface 214 of a wall 215 of the grommet body 202. The segment of the grommet body 202 extending between the first and second flanges 210, 212 may be referred to as a wall-engaging segment 216. When the grommet 200 is installed in a panel, the wall-engaging segment 216 may be housed within an opening in the panel. A segment of the grommet body 202 extending beyond the second flange 212 to the proximal end 206 may be referred to as the handle segment 218. The handle segment 218 may provide a pulling surface which may be gripped for installation of the grommet 200 within the opening in the panel. In some embodiments, the grommet body 202 may comprise a slit 220 extending along at least a segment of the length $L_{202}$. The slit 220 may extend through the wall 215 between the outer surface 214 and inner surface 222 of the grommet body 202.

The grommet body 202 may have a shape exhibiting rotational symmetry about the longitudinal axis 208 in the handle segment 218 and the wall-engaging segment 216. As previously discussed regarding the grommet 100, the grommet body 202 may be cylindrical in some embodiments. For example, the grommet body 202 may be cylindrically shaped in the handle segment 218 and the wall-engaging segment 216. In other embodiments, the grommet body 202 may be tubular and hollow. In such embodiments, the grommet body 202 may comprise an aperture 224 extending from the distal end 204 to the proximal end 206. The aperture 224 may be defined by an inner surface 222 of the grommet body 202 arrayed about the longitudinal axis 208.

The inner surface 222 may comprise a curved surface extending concentrically about the longitudinal axis 208. The inner surface 222 may have a constant diameter $D_{222}$. By way of example and not limitation, the diameter $D_{222}$ of the inner surface 222 may extend in a range from about 0.4 inch to 2.0 inches and, more particularly, may measure about 0.85 inches. The wall 215 extending between the inner surface 222 and outer surface 214 may have a thickness extending in a range from about 0.1 inch to 0.5 inch and, more particularly, may measure about 0.2 inch. In some embodiments, the grommet body 202 may have a length $L_{202}$ extending in a range from about 3 inches to 15 inches and, more particularly, measuring about 7.2 inches.

In some embodiments, the aperture 224 may be at least partially disrupted by a clamping element 226. The clamping element 226 may be similar to the clamping element 124 and may comprise a volume of material that substantially fills at least a segment of the aperture 224. The clamping element 226 may extend longitudinally and radially within a segment of the aperture 224 within the wall-engaging segment 216. The clamping element 226 may comprise at least one through-hole 228 extending longitudinally therethrough. In some embodiments, the clamping element 226 may be integrally formed with the wall-engaging segment 216. In such embodiments, the thickness of the walls 215 increases within the wall-engaging segment 216 and the inner diameter $D_{222}$ decreases to form the clamping element 226.

The first flange 210 may be located at the distal end 204 of the grommet body 202. The second flange 212 may be longitudinally spaced apart from the first flange 210 and may be located intermediately along the length $L_{202}$ of the grommet body 202. As illustrated in FIG. 6, each of the first and second flanges 210, 212 may comprise mutually facing (e.g., opposing) sealing surfaces 230. On a side of each flange 210, 212 opposite the sealing surface 230 is an exterior surface 232, 234, respectively. Each of the first and second flanges 210, 212 may also comprise an outer surface 236, 238, respectively, extending between the sealing surfaces 230 and the exterior surfaces 232, 234 thereof As previously described regarding the grommet 100, the sealing surfaces 230 may be planar and may extend radially outward and perpendicular to the longitudinal axis 208. The sealing surfaces 230 may be sized and configured to form a seal about and adjacent to the opening in the panel in which the grommet 200 is installed, as will be explained in further detail with regard to FIGS. 11 through 14. When the grommet 200 is installed in the panel, the sealing surfaces 230 of the first and second flanges 210, 212 may lie on opposing surfaces of the panel. Therefore, the first and second flanges 210, 212 may be spaced apart by a distance that is substantially equal to the thickness of the panel in which the grommet 200 may be installed. For example, the first and second flanges 210, 212 may be spaced apart by a distance of at least one inch. By way of example and not limitation, the first and second flanges 210, 212 may be spaced apart by a distance extending in a range from about 1.0 inch to 4.0 inches and, more particularly, measuring about 1.75 inches.

In some embodiments, the grommet 200 may be sized and configured to clear structural, mechanical, or electrical components of a system located adjacent to the panel during installation of the grommet 200 and/or to be installed between such system components in a final installation position. For example, the first flange 210 may be formed to have an initial shape substantially similar to the first flange 110. The initial shape of the first flange 210 may comprise a circular cross-sectional when viewed in a plane transverse to the longitudinal axis 208, as illustrated by the dashed lines in FIG. 5, and may be substantially hemispherical in a perspective view. To accommodate installation between system components during and/or after installation, at least one of an upper and lower portion of the first flange 210 (in the view of FIG. 5) may be removed to form one or more planar segments 246.

As best illustrated in FIG. 5, the first and second flanges 210, 212 may exhibit reflective symmetry. The first flange 210 may have a horizontal plane of symmetry 240 including the longitudinal axis 208 and a vertical plane of symmetry 242 also including the longitudinal axis 208. The outer surface 236 of the first flange 210 includes opposing curved segments 244 and opposing planar segments 246 such that the first flange 210 may have a cross-sectional shape of an interior segment of a segmented circle defined by two parallel extending chords, when viewed in a plane transverse to the longitudinal axis 208. The planar segments 246 may be parallel and extend between the curved segments 244. The planar segments 246 may be located equidistant from the longitudinal axis 208. For example, the planar segments 246 may be located between about 0.2 inch and 1 inch and, more particularly, about 0.5 inch from the longitudinal axis 208. Therefore, a height $H_{210}$ of the first flange 210 measured between the planar segments 246 may extend in a range from about 0.4 inch to 2 inches and, more particularly, may measure about 1 inch. In some embodiments, the curved segments 244 may have a radius extending in a range from about 0.3 inch to 1.4 inches and, more particularly, measuring about 0.7 inch. Therefore, a diameter $D_{244}$ of the first flange 210 measured between the curved segments 244 may extend in a range from about 0.6 inch to 2.8 inch and, more particularly, may measure about 1.4 inches.

Similar to the first flange 110 of the grommet 100, the first flange 210 may have a curved, exterior surface 232 in some embodiments. For example, the exterior surface 232 may be semi-circular, semi-oval, semi-ellipse, or domed in shape. As illustrated in the cross-sectional view of FIG. 6, the exterior surface 232 of the first flange 210 may have a radius of curvature $R_{232}$ in a range extending from about 0.15 inch to 0.75 inch and, more particularly, may be about 0.38 inch.

As illustrated in FIGS. 5 and 6, the second flange 212 may comprise the planar, sealing surface 230, a planar, exterior surface 234, and a planar, outer surface 238 extending between the sealing surface 230 and exterior surface 234. The outer surface 238 may be curved such that the second flange 212 may be substantially annular, or ring shaped. The second flange 212 may have a diameter $D_{212}$ extending in a range from about 0.5 inch to 2.0 inches and, more particularly, measuring about 1.07 inches. The second flange 212 may have a thickness measured between the sealing surface 230 and the exterior surface 234 of between about 0.1 inch and 0.4 inch and, more particularly, of about 0.18 inch.

As illustrated in FIGS. 4 through 6, the slit 220 may extend through the second flange 212 in some embodiments. Therefore, the second flange 212 may be discontinuous such that the second flange 212 may extend radially about only a major portion of the outer surface 214 of the grommet body 202, as illustrated in FIGS. 4 and 5.

In some embodiments, the flanges 210, 212 may have an equal maximum diameter when measured in at least one direction measured transverse to the longitudinal axis 208. In other embodiments, the flanges 210, 212 may have unequal maximum diameters when measured in at least one direction measured transverse to the longitudinal axis 208. For example, as illustrated in FIGS. 5 and 6, in the vertical direction, the second flange 212 may have a greater maximum diameter $D_{212}$ than the first flange 210 such that the diameter $D_{212}$ is greater than the height $H_{210}$. In the horizontal direction, and the first flange 210 may have a greater maximum diameter $D_{210}$ than the second flange 212 in the horizontal direction.

With reference to FIG. 5, the clamping element 226 may be located to apply a compressive force on an elongated element 404 (FIG. 14) in the through-hole 228 responsive to disposition of the wall-engaging segment 216 in an opening of a panel. In some embodiments, the clamping element 226 may extend at least partially through (e.g., within a segment of) the aperture 224 within the grommet body 202. The clamping element 226 may extend longitudinally between the sealing surfaces 230 of the first and second flanges 210, 212 such that the clamping element 226 extends exclusively within and radially inward of the wall-engaging segment 216. In some embodiments, the clamping element 226 may be coextensive with a length of the wall-engaging segment 216 measured between the sealing surfaces 230 of the grommet body 202. In other embodiments, the clamping element 226 may extend along less than the entire length of the wall-engaging segment 216 such that a thickness $T_{226}$ of the clamping element 226 is less than a distance measured between the sealing surfaces 230 of the first and second flanges 210, 212. By way of example and not limitation, the thickness $T_{226}$ may extend in a range from about 0.2 inch to 1.0 inch and, more particularly, may measure about 0.5 inch. In some embodiments, the clamping element 226 may be located equidistant from the sealing surface 230 of the first and second flanges 210, 212, respectively. In other embodiments, the clamping element 226 may be located proximate to one of the first and second flanges 210, 212 and distal from the other flange. For example, the clamping element 226 may be located proximate to the first flange 210 and distal from the second flange 212. In some embodiments, the clamping element 226 may be located between 0.1 and 0.5 inch from the sealing surface 230 of the first flange 210 and, more particularly, may be located 0.26 inch from the sealing surface 230 of the first flange 210.

As previously described regarding the at least one through-hole 126, the at least one through-hole 228 may be sized and configured to retain an elongated element 404 (FIG. 14), such as a wire, cable, or other electrical element. For example, the at least one through-hole 228 may have a diameter extending in a range from about 0.1 inch to 0.4 inch and, more particularly, may measure about 0.19 inch. In some embodiments, a central axis 248 of the at least one through-hole 228 may be coaxial with the longitudinal axis 208 of the grommet body 202. In other embodiments, the clamping element 226 may comprise more than one through-hole 228.

The slit 220 may form an opening in the wall 215 of the grommet body 202. The slit 220 may extend through the wall 215 between the inner surface 222 and outer surface 214 of the grommet body 202. The slit 220 may extend through the wall 115 in at least one of the handle segment 218 and the wall-engaging segment 216. As previously discussed, the slit 220 may also extend through the second flange 212. The slit 220 may be provided such that the elongated element 404 (FIG. 14) may deviate from the grommet 200 before reaching the proximal end 206 of the grommet 200. For example, the slit 220 may allow the elongated element 404 to extend into a space between opposing surfaces of a panel as described in further detail with regard to FIG. 14. By way of example and not limitation, the slit 220 may have a height $H_{220}$ extending from about 0.1 inch to 0.5 inch and, more particularly, measuring about 0.24 inch.

FIGS. 7 through 10 illustrate a grommet 300 according to yet other embodiments of the present disclosure. The grommet 300 comprises a grommet body 302 having a distal end 304 and a proximal end 306. Extending from distal end 304 to the proximal end 306, the grommet body 302 may comprise a flared segment 308, a wall-engaging segment 310, a lip 312, and a handle segment 314. A longitudinal axis 316 extends centrally through a through-hole 318 of a clamping element 320 within the wall-engaging segment 310 along a length $L_{302}$ of the grommet body 302.

The grommet body 302 may be substantially rectangular in cross-sectional area when viewed in a plane transverse to the longitudinal axis 316. The grommet body 302 may comprise two, parallel sidewalls 322 and a bottom wall 324 extending along its length $L_{302}$. The grommet body 302 may also comprise a top wall 326 along at least a segment of its length $L_{302}$. In some embodiments, each of the wall-engaging segment 310 and the lip 312 may be defined by sidewalls 322, the bottom wall 324, and the top wall 326. Each of the flared segment 308 and the handle segment 314 may be defined by the sidewalls 322 and the bottom wall 324 but lack a top wall. The sidewalls 322, the bottom wall 324, and the top wall 326 may define an aperture 305.

Figure 9:
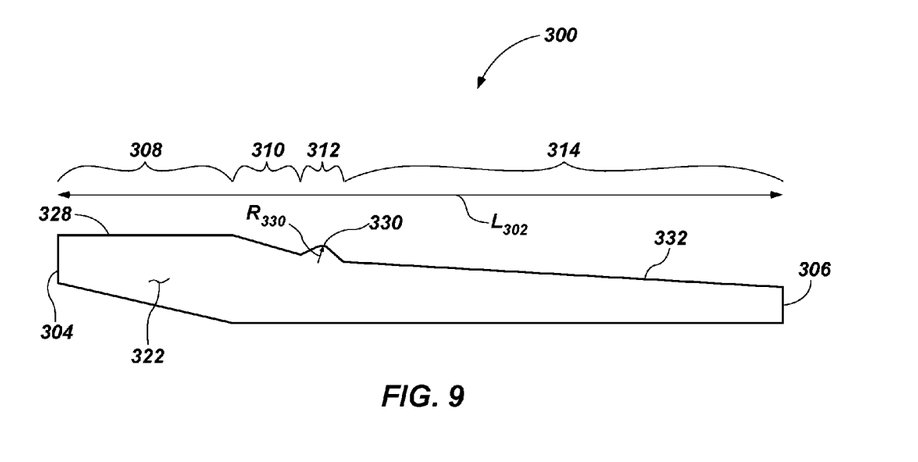
Figure 10:
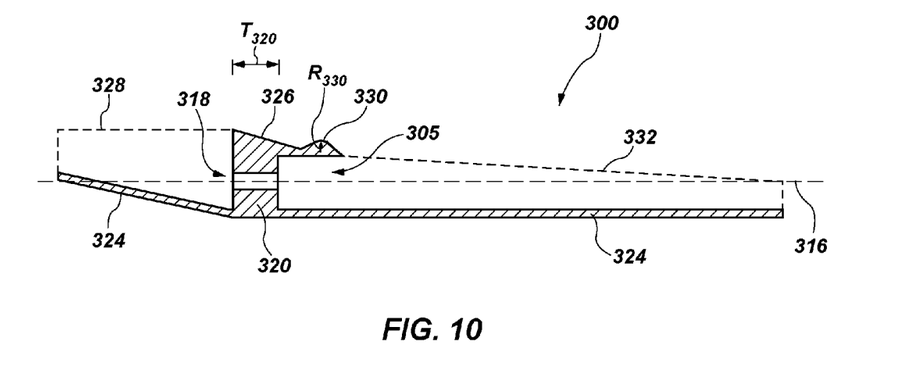

The flared segment 308 refers to the segment of the grommet body 302 in which a height of the sidewalls 322 increases between the distal end 304 and the wall-engaging segment 310, as illustrated in the side view of FIG. 9 and by the dashed line in FIG. 10. An upper surface 328 of each sidewall 322 in the flared segment 308 may be planar. The upper surface 328 may extend parallel to the longitudinal axis 316. The bottom wall 324 may also be planar in the flared segment 308. The bottom wall 324 may extend at an angle relative to the longitudinal axis 316 such that the bottom wall 324 slopes downward between the distal end 304 and the wall-engaging segment 310. Therefore, the sidewalls 322 may increase in height between the distal end 304 and the wall-engaging segment 310.

As previously described herein, the wall-engaging segment 310 refers to the segment of the grommet body 302 that may be housed within an opening when the grommet 300 is installed in the panel. The clamping element 320 comprises a volume of material extending exclusively within the wall-engaging segment 310 and, more particularly, within the sidewalls 322, bottom wall 324, and top wall 326 of the wall-engaging segment 310. The clamping element 320 comprises at least one through-hole 318. The wall-engaging segment 310 and the clamping element 320 may decrease in height between the flared segment 308 and the lip 312. The top wall 326 may be planar in the wall-engaging segment 310. In some embodiments, the top wall 326 may extend at an angle relative to the longitudinal axis 316 such that the top wall 326 slopes downwards between the flared segment 308 and the lip 312. The bottom wall 324 may also be planar in the wall-engaging segment 310. The bottom wall 324 may extend parallel to the longitudinal axis 316 between the flared segment 308 and the lip 312.

With reference to FIG. 10, the clamping element 320 may be located to apply a compressive force on an elongated element to retain the elongated element in the through-hole 318 responsive to disposition of the wall-engaging segment 310 in an opening of a panel. In some embodiments, the clamping element 320 may be coextensive with a length of the wall-engaging segment 310 of the grommet body 302. In such embodiments, the clamping element 320 may extend longitudinally within the wall-engaging segment 310 between the flared segment 308 and the lip 312. In other embodiments, the clamping element 320 may extend partially within (e.g., within a segment of) the wall-engaging segment 310 such that a thickness $T_{320}$ of the clamping element 320 is less than a distance measured between the flared segment 308 and the lip 312. By way of example and not limitation, the thickness $T_{320}$ may extend in a range from about 0.2 inch to 1.0 inch and, more particularly, may measure about 0.5 inch. In some embodiments, the clamping element 320 may be located equidistant between the flared segment 308 and the lip 312. In other embodiments, the clamping element 320 may be located proximate to one of the flared segment 308 and the lip 312 and distal from the other. In the embodiment illustrated in FIG. 10, the clamping element 320 is proximate to the flared segment 308 and distal from the lip 312. By way of example and not limitation, the clamping element 320 may be located between about 0.1 inch and 0.5 inch from the flared segment 308 and, more particularly, may be located 0.26 inch from the lip 312.

As previously described regarding the through-hole 126 of the grommet 100, the through-hole 318 may be sized and configured to retain an elongated element 404 (FIG. 13), such as a wire, cable, or other electrical element. For example, the through-hole 318 may have a diameter extending in a range from about 0.1 inch to 0.4 inch and, more particularly, measuring about 0.19 inch.

The lip 312 may be sized and configured to form a seal about at least a segment of an opening within a panel in which the grommet 300 may be installed. The top wall 326 in the lip 312 segment of the grommet body 302 may be planar, non-planar, or a combination. As best illustrated in FIGS. 9 and 10, the top wall 326 in the lip 312 may comprise two planar segments converging or connected at an apex 330. In such embodiments, the sidewalls 322 extending between the bottom wall 324 and the top wall 326 may increase and decrease in height between the wall-engaging segment 310 and the handle segment 314. In some embodiments, the apex 330 (e.g., the highest point of the top wall 326 of the lip 312) may be located intermediately along a length of the lip 312. For example, the apex 330 may be located approximately equidistant between the wall-engaging segment 310 and the handle segment 314. The sidewalls 322 may have a maximum height in the lip 312 at the apex 330. For example, the sidewalls 332 may have a maximum height extending in a range from about 0.5 inch to about 2.0 inches and, more particularly, about 0.9 inch. In some embodiments and as illustrated in FIG. 10, the apex 330 may be curved having a radius of curvature $R_{330}$ extending in a range from about 0.03 inch to 0.1 inch and, more particularly, measuring about 0.06 inch. In other embodiments, the apex 330 may be pointed. The bottom wall 324 of the lip 312 may be planar and may extend parallel to the longitudinal axis 316 in the lip 312.

Also as previously described herein, the handle segment 314 refers to the segment of the grommet body 302 provided as a pulling surface which may be gripped for installation of the grommet 300 within the opening in the panel. The handle segment 314 may be tapered such that a height of the sidewalls 322 decreases between the lip 312 and the proximal end 306. An upper surface 332 of the each sidewall 322 in the handle segment 314 may be planar. As illustrated in FIG. 9 and as illustrated by the dashed line in FIG. 10, the upper surface 332 may extend at an angle relative to the longitudinal axis 316 such that the upper surface 332 slopes downward between the lip 312 and the proximal end 306. The bottom wall 324 may also be planar in the handle segment 314. The bottom wall 324 may extend parallel to the longitudinal axis 316.

Figure 8:
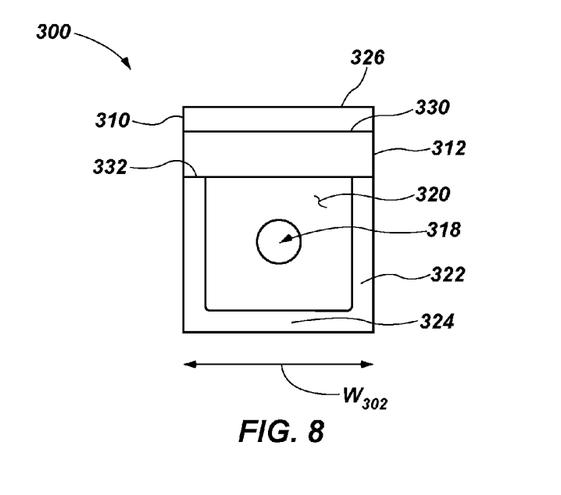

The grommet body 302 may have a substantially rectangular cross-sectional shape when viewed from the proximal end 306, as illustrated in FIG. 8, or in a plane transverse to the longitudinal axis 316. The grommet body 302 may have a uniform width $W_{302}$ between the proximal end 306 and distal end 304. For example, the grommet body 302 may have a width $W_{302}$ extending in a range from about 0.4 inch and 1.7 inch and, more particularly, measuring about 0.83 inch. By way of example and not limitation, the grommet body 302 may have a length $L_{302}$ extending in a range from about 4 inches to 17 inches and, more particularly, about 8.3 inches.

As previously described, the sidewalls 322 may vary in height between the proximal end 306 and distal end 304. For example, in the flared segment 308, the sidewalls 322 may increase in height from about 0.20 inch to about 2 inches and, more particularly, from about 0.55 inch to 1.0 inch. In the wall-engaging segment 310, the sidewalls 322 may decrease in height from about 2.0 inches to about 0.4 inch and, more particularly, from about 1.0 inch to about 0.8 inch. In the handle segment 314, the sidewalls 322 may decrease in height from about 1.3 inches to about 0.2 inch and, more particularly, from about 0.68 inch to about 0.4 inch.

The sidewalls 322 may also vary in thickness. In some embodiments, the sidewalls 322 may have a greater thickness in the lip 312 and handle segment 314 than in the flared segment 308. For example, the sidewalls 322 may have a thickness extending in a range from about 0.025 inch to 0.1 inch and, more particularly, measuring about 0.05 inch in the flared segment 308. The sidewalls 322 may have a thickness extending in a range from about 0.05 inch to 0.2 inch and, more particularly, measuring about 0.1 inch in the lip 312 and handle segment 314. In some embodiments, the bottom wall 324 may also vary in thickness. In some embodiments, the bottom wall 324 may have a greater thickness in the lip 312 and handle segment 314 than in the flared segment 308. For example, the bottom wall 324 may have a thickness extending in a range from about 0.025 inch to 0.1 inch and, more particularly, measuring about 0.05 inch in the flared segment 308. The bottom wall 324 may have a thickness extending in a range from about 0.05 inch to 0.2 inch and, more particularly, measuring about 0.1 inch in the lip 312 and handle segment 314.

Embodiments of the present disclosure also include methods of installing a grommet 100, 200, 300 into a panel 400 of a bulkhead. While the method of installing grommets according to the present disclosure is explained primarily with reference to the grommet 100 of FIGS. 1 through 3, the method of installing the grommet 200 of FIGS. 4 through 6 and the grommet 300 of FIGS. 7 through 10 is substantially similar. The grommet 100 may be installed in an opening 402 having an inner surface 412. The opening 402 may extend within the panel 400 between a first surface 408 and a second, opposing surface 410. The opening 402 and, more particularly, a cross-section of the inner surface 412 may vary in shape. For example, in some embodiments, the opening 402 may have a cylindrical cross-section in which the grommets 100 and 200 may be installed. In other embodiments, the opening 402 may have a rectangular cross-section in which the grommet 300 may be installed.

Prior to seating the grommet 100 in the opening 402, an elongated element 404 may be inserted through the aperture 120 of the grommet body 102. More particularly, in some embodiments, the elongated element 404 may extend through the aperture 120 and may be disposed in the through-hole 128 of the clamping element 124.

Figure 11:
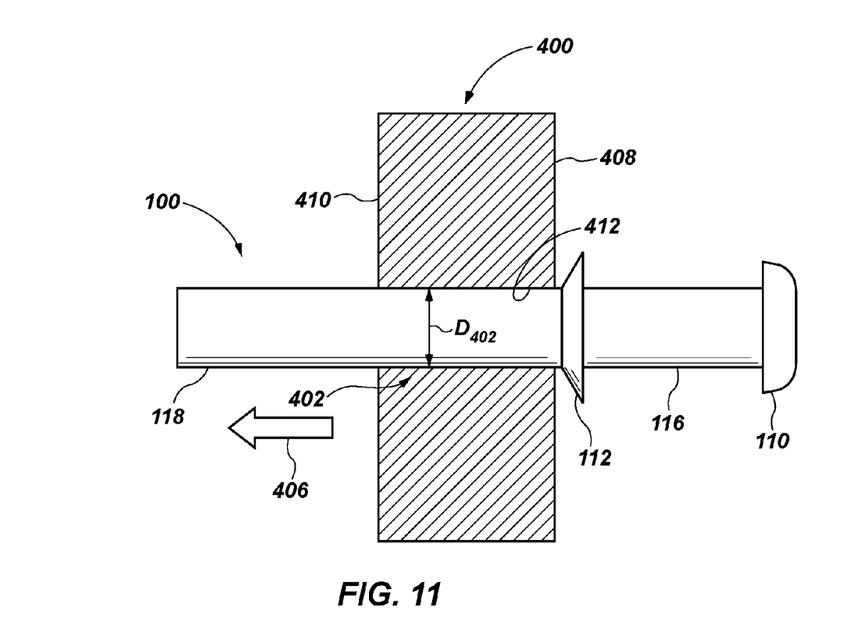
FIGS. 11 through 15 illustrate methods of installing a grommet according to embodiments of the present disclosure in an opening in a panel.

As illustrated in FIG. 11, in some embodiments, the handle segment 118, together with the elongated element 404 (FIG. 13), may be received or inserted in the opening 402 first. By gripping the handle segment 118, the grommet 100 may be pulled through the opening 402. For example, a tensile or pulling force may be applied to the handle segment 118 as indicated by the directional arrow 406. The magnitude of the tensile force may vary based on the dimensions of the grommet 100 including, but not limited to, the wall thickness, the varying diameter along the length thereof, etc., and based on the composition of the grommet 100.

In some embodiments, an inner dimension of the inner surface, such as a diameter $D_{402}$ of the inner surface 412, of the opening 402 may be less than the outer dimension of the grommet 100. For example, at least one of the maximum diameter $D_{110}$ of the first flange 110, the maximum diameter $D_{112}$ of the second flange 112, and an outer diameter of the grommet body 102 in the handle segment 118 and/or the wall-engaging segment 116 may be greater than the inner diameter $D_{402}$ of the opening 402 such that the grommet 100 may be retained in the opening 402 by an interference fit. Similarly, the inner dimension of the inner surface of the opening 402 may be less than the outer dimension of the grommet 200. For example, at least one of the maximum diameter $D_{244}$ and/or the height $H_{210}$ of the first flange 210, the maximum diameter $D_{212}$ of the second flange 212, and an outer diameter of the grommet body 202 in the handle segment 218 and/or the wall-engaging segment 216 may be greater than the inner diameter $D_{402}$ of the opening 402 such that the grommet 100 may be retained in the opening 402 by an interference fit. Further, the inner dimension of the inner surface of the opening 402 may be less than the outer dimension of the grommet 300. For example, at least one of the wall-engaging segment 310 and the lip 312 may have an outer dimension greater than the inner diameter $D_{402}$ of the opening 402, and/or at least a portion of the handle segment 314 and/or the flared segment 308 may have an outer dimension greater than the inner diameter $D_{402}$ of the opening 402.

Figure 12:
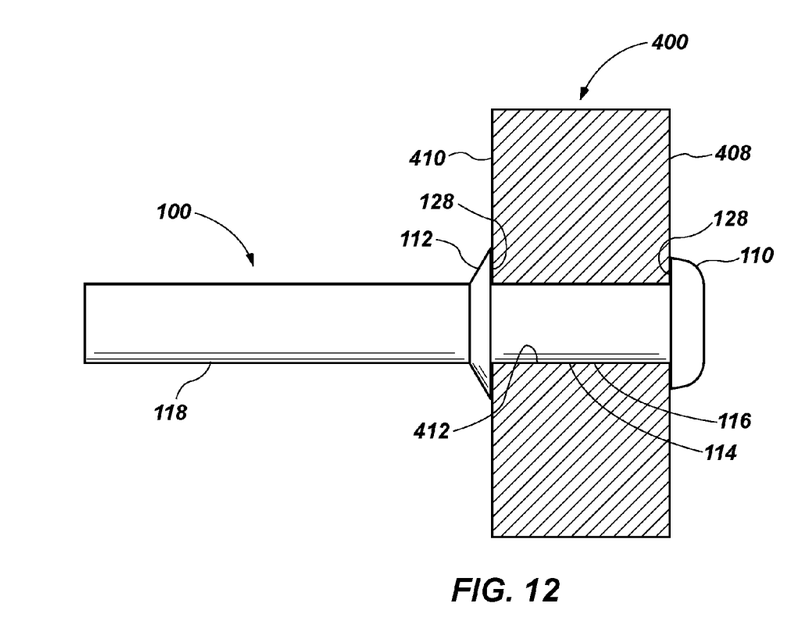
Figure 13:
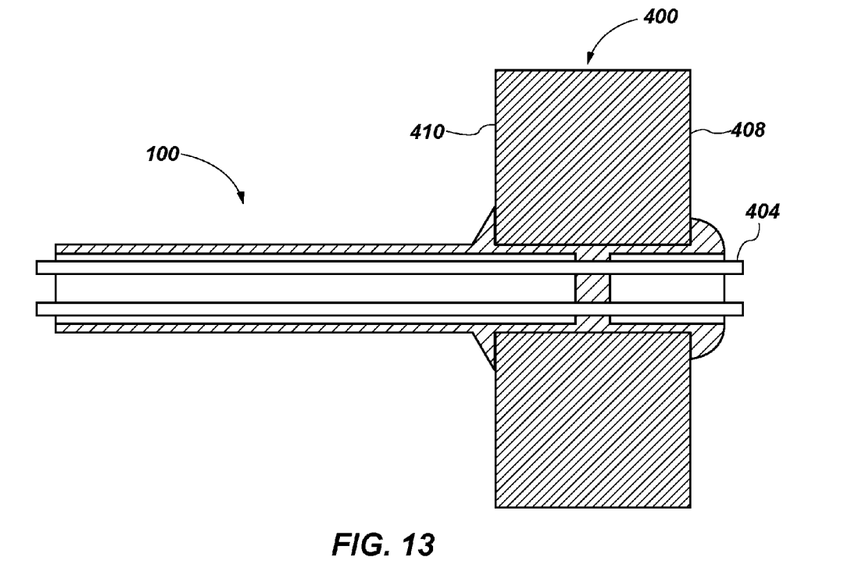
Figure 15:
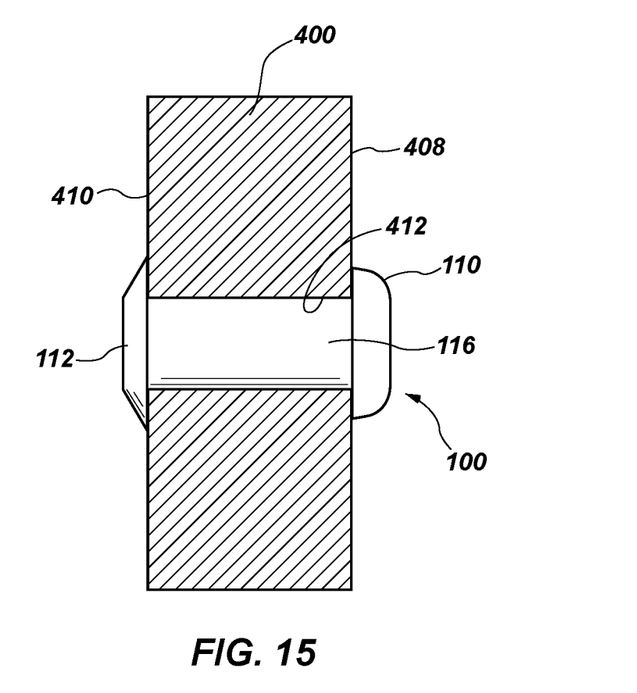

With reference to FIG. 11, as the handle segment 118 is pulled through the opening 402, a length of the grommet body 102 in, for example, the handle segment 118, the second flange 112, and/or the wall-engaging segment 116 may increase in length and decrease in diameter. The grommet 100 may be pulled through the opening 402 until the second flange 112 passes through the opening 402 from the first surface 408 to the second surface 410 of the panel 400. The grommet 100 may be installed (e.g., seated) when the sealing surface 128 of the first flange 110 is disposed adjacent the first surface 408 of the panel 400 and the sealing surface 128 of the second flange 112 is disposed adjacent the second surface 410 of the panel 400, as illustrated in FIGS. 12, 13, and 15. When the grommet 100 is seated, the wall-engaging segment 116 may be housed (e.g., enclosed) within the opening 402 in the panel 400 such that the outer surface 114 may be adjacent the inner surface 412.

The grommets 100, 200, 300 may have an outer dimension proximate to at least the clamping element 124, 226, 320 that is greater than an inner dimension of the opening 402 such that the grommet 100, 200, 300 is retained in the opening by interference fit. For example, as previously discussed, the inner dimension $D_{402}$ of the opening 402 may be less than the outer diameter $D_{114}$ of the grommet body 102 in the wall-engaging segment 116 such that the inner surface 412 of the opening 402 exerts a radially inward and compressive force on the wall-engaging segment 116. The compressive force may be transferred to the clamping element 124 and the elongated element 404 extending through the at least one through-hole 126 therein. The compressive force provides a clamping force by the clamping element 124 on the elongated element 404 passing therethrough. The clamping force applied by the clamping element 124 may prevent longitudinal movement of the elongated element 404 within the grommet 100. In other words, the clamping element 124 may retain the elongated element 404 by the interference fit between the grommet 100 and the opening 402. The clamping force provided by the clamping element 124 renders the use of conventional mechanical fasteners, such as p-clamps, cable ties, etc., or adhesives, such as tape, glue, epoxy, etc., applied after installation of a grommet superfluous and unnecessary.

Figure 14:
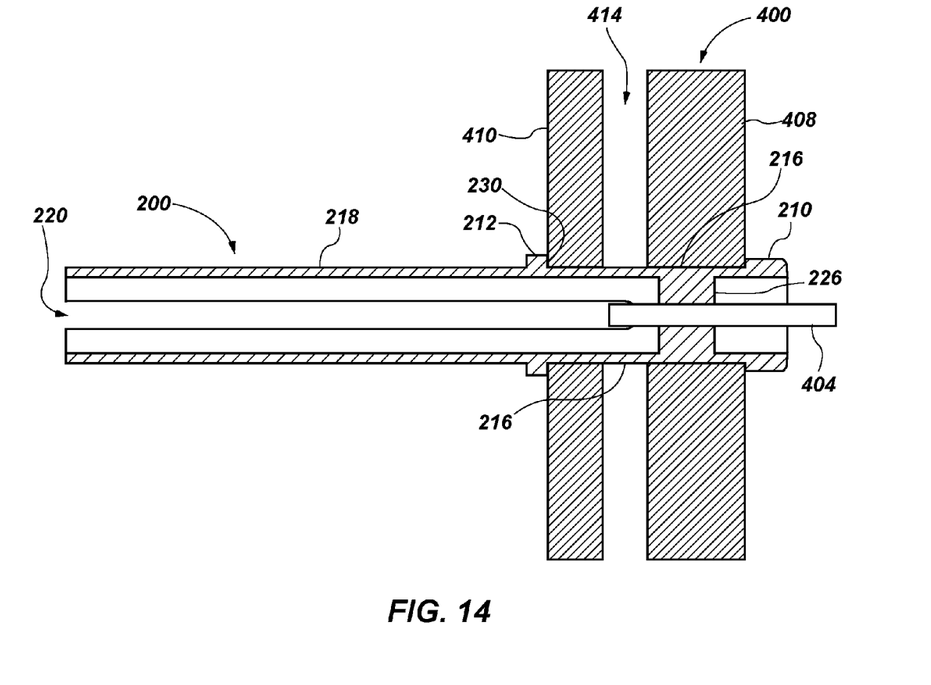

As illustrated in FIG. 13, in some embodiments, the elongated element 404 may extend through the opening 402 from the first surface 408 to the second surface 410. In other embodiments, the elongated element 404 may extend partially through the opening 402. In such embodiments, as illustrated in FIG. 14, the panel 400 may comprise an opening 414 between the first surface 408 and the second surface 410. As previously discussed regarding the grommet 200 illustrated in FIGS. 4 through 6 and 14, the grommet 200 may comprise a slit 220 extending through a segment of the wall-engaging segment 216. In such embodiments, the elongated element 404 may deviate from the grommet 200 and extend into the opening 414 within the panel 400 through the slit 220.

As illustrated in FIG. 15, in some embodiments, a segment of the handle segment 118 may be partially removed after the grommet 100 is seated within the opening 402. In other embodiments, at least a portion of the handle segment 118 may remain and may provide strain relief for the elongated element 404.

In yet additional embodiments, the present disclosure also include methods of forming grommets as described herein, such as the grommets 100, 200, 300. In some embodiments, and as previously noted, the grommets 100, 200, 300 may be formed of a material elastically deformable in tension and compression that may be bent, compressed, stretched, twisted or otherwise deformed or manipulated in shape and dimensions. For example, as explained with reference to FIGS. 11 through 15, the grommets 100, 200, and 300 may be stretched in a longitudinal or lengthwise direction, such as during installation, and compressed in a radial or inward direction by walls of a panel opening through which the grommet has been inserted. The elastically deformable material may possess sufficient elasticity to substantially return to its original shape after being deformed. In some embodiments, the grommet 100, 200, 300 may comprise an elastomeric material, such as a synthetic rubber and, more particularly, silicone rubber. In yet other embodiments, the grommet 100, 200, 300 may comprise an elastomeric material selected based on the environmental conditions, such as temperature differentials, to which the grommet 100, 200, 300 may be exposed while maintaining its elasticity, resiliency, and clamping force on the elongated element 404.

The grommets 100, 200, 300 may be formed by a molding process. In some embodiments, the grommets 100, 200, 300 may be formed by closed molding processes as known in the art and, therefore, not described in detail here. In other embodiments, the grommets 100, 200, 300 may be formed by an additive manufacturing process, such as by a 3D printing method. In yet other embodiments, the molding process may employ a 3D printed, water soluble mold.

The grommets 100, 200, 300 may be formed as a single, unitary piece. In other words, each elements or segments of the grommet body 102, 202, 303 (e.g., flanges, handle segment, wall-engaging segment, clamping element, etc.) may be integrally formed.

While the disclosed device structures and methods are susceptible to various modifications and alternative forms in implementation thereof, specific embodiments have been shown by way of example in the drawings and have been described in detail herein. However, it should be understood that the present disclosure is not limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. A grommet for installation in an opening of a panel, comprising:
   a grommet body comprising an elastically deformable material having a longitudinal axis extending from a proximal end to a distal end of the grommet body, the grommet body comprising:
      an aperture extending longitudinally through the grommet body between the proximal end and the distal end and having a substantially constant cross-sectional area in a plane transverse to the longitudinal axis between the proximal end and the distal end;
      a wall-engaging segment defining a longitudinal segment of the aperture, the wall-engaging segment located to be enclosed by a wall of the opening when the grommet is installed in the panel; and
      a clamping element located within the wall-engaging segment of the aperture and occluding the aperture in the wall-engaging segment, the clamping element comprising at least one longitudinally extending through-hole sized and configured to receive an elongated element, the clamping element located to apply a compressive force on the elongated element to retain the elongated element in the through-hole of the grommet body responsive to disposition of the wall-engaging segment in the opening of the panel.

2. The grommet of claim 1, wherein the clamping element is integral with the wall-engaging segment.

3. The grommet of claim 1, wherein the clamping element has a length less than a length of the wall-engaging segment.

4. The grommet of claim 1, wherein the grommet body comprises a substantially rectangular cross-sectional shape when viewed in a plane transverse to the longitudinal axis.

5. The grommet of claim 1, wherein the grommet body comprises a substantially circular cross-sectional shape when viewed in a plane transverse to the longitudinal axis.

6. The grommet of claim 1, wherein the grommet body further comprises a first flange at the distal end and a second flange longitudinally spaced apart and separated from the first flange by the wall-engaging segment.

7. The grommet of claim 6, wherein the grommet body further comprises a handle segment extending from the second flange to the proximal end.

8. The grommet of claim 6, wherein the first flange is substantially hemispherical in shape and the second flange is frustoconical in shape.

9. The grommet of claim 6, wherein the first flange and the second flange comprise mutually facing sealing surfaces extending radially outward from an outer surface of the grommet body.

10. The grommet of claim 6, wherein the first flange has a cross-sectional shape having a first curved surface, a second curved surface, and two parallel, planar surfaces extending between the first and second curved surfaces when viewed in a plane transverse to the longitudinal axis, and wherein the second flange has a substantially circular cross-sectional shape.

11. The grommet of claim 1, wherein the grommet body comprises a slit extending longitudinally and partially along a length of the grommet body between the wall-engaging segment and the proximal end.

12. The grommet of claim 1, wherein the grommet body has a shape exhibiting rotational symmetry about the longitudinal axis.

13. A method of installing a grommet into an opening extending through a panel, comprising:
   inserting an elongated element through a through-hole in a clamping element of a grommet, the grommet comprising:
      a grommet body comprising an elastically deformable material having a longitudinal axis extending from a proximal end to a distal end;
      an aperture extending longitudinally through the grommet body between the proximal end and the distal end and having a substantially constant cross-sectional area between the proximal end and the distal end;
      a wall-engaging segment defining a longitudinal segment of the aperture; and
      the clamping element located within the wall-engaging segment of the aperture and occluding the aperture in the wall-engaging segment;
   inserting the proximal end of the grommet and the elongated element extending therethrough in an opening extending between a first side and an opposing, second side of a panel;
   pulling the proximal end of the grommet through the opening from the first side to the second side to enclose the wall-engaging segment and the clamping element within the opening between the first side and the second side of the panel and apply a compressive force to and through the clamping element on the elongated element to retain the elongated element within the grommet.

14. The method of claim 13, further comprising selecting the grommet to have an outer dimension proximate the clamping element greater than an inner dimension of the opening such that the grommet is retained in the opening by interference fit.

15. The method of claim 13, wherein inserting the proximal end of the grommet in the opening comprises inserting a handle segment of the grommet in the opening.

16. The method of claim 15, wherein enclosing the wall-engaging segment and the clamping element within the opening comprises enclosing a wall-engaging segment of the grommet extending between a first flange and a second flange of the grommet within the opening.

17. The method of claim 16, wherein pulling the proximal end of the grommet through the opening comprises pulling the handle segment and the second flange through the opening such that the handle segment and the second flange extend beyond the second side of the panel.

18. The method of claim 15, further comprising, after enclosing the wall-engaging segment and the clamping element within the opening, removing the handle segment from the grommet.

19. A grommet for installation in an opening of a panel, comprising:
   a grommet body comprising an elastically deformable material and having a longitudinal axis extending from a proximal end to a distal end thereof, the grommet body comprising:
      a bottom wall;
      a top wall;
      sidewalls extending from the proximal end to the distal end and extending between the bottom wall and the top wall, wherein the bottom wall, top wall, and sidewalls define a wall-engaging segment along a portion of a longitudinal length of the grommet body, the wall-engaging segment located to be enclosed by a wall of an opening when the grommet is installed in a panel, wherein the bottom wall and the sidewalls define a handle segment located proximal to the wall-engaging segment and extending to the proximal end, the handle segment lacking the top wall; and
   a clamping element extending within the wall-engaging segment, the clamping element comprising at least one through-hole, the at least one through-hole sized and configured to receive an elongated element therein and to apply a compressive force on the elongated element to retain the elongated element in the grommet body responsive to disposition of the clamping element within the opening of the panel during installation of the grommet.

20. The grommet of claim 19, wherein the top wall, the bottom wall, and the sidewalls define a rectangular cross-sectional shape when viewed in a plane transverse to the longitudinal axis.

21. The grommet of claim 19, wherein the clamping element is integrally formed with the wall-engaging segment.

22. The grommet of claim 19, wherein the clamping element has a length less than a length of the wall-engaging segment.

23. The grommet of claim 19, wherein the sidewalls vary in at least one of height and thickness between the proximal end and the distal end.

24. The grommet of claim 19, wherein the grommet body exhibits a shape exhibiting reflective symmetry about a vertical plane including the longitudinal axis and extending parallel to the sidewalls.

* * * * *